US007645714B2

(12) United States Patent
Kawashima et al.

(10) Patent No.: US 7,645,714 B2
(45) Date of Patent: *Jan. 12, 2010

(54) CRYSTALLIZED GLASS, AND METHOD FOR PRODUCING CRYSTALLIZED GLASS

(75) Inventors: Yasuyuki Kawashima, Sagamihara (JP); Naoyuki Goto, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 173 days.

This patent is subject to a terminal disclaimer.

(21) Appl. No.: 11/806,876

(22) Filed: Jun. 5, 2007

(65) Prior Publication Data

US 2007/0281849 A1 Dec. 6, 2007

(30) Foreign Application Priority Data

Jun. 6, 2006 (JP) .............................. 2006-156878

(51) Int. Cl.
*C03C 10/14* (2006.01)
*C03C 10/12* (2006.01)
(52) U.S. Cl. ............................................. 501/4; 501/7
(58) Field of Classification Search .................... 501/4, 501/7
See application file for complete search history.

(56) References Cited

U.S. PATENT DOCUMENTS

| 3,977,886 | A | * | 8/1976 | Muller | 501/4 |
| 4,507,392 | A | * | 3/1985 | Rittler | 501/4 |
| 4,515,897 | A | | 5/1985 | Sack et al. | |
| 5,336,643 | A | * | 8/1994 | Goto et al. | 501/4 |
| 5,591,682 | A | * | 1/1997 | Goto | 501/4 |
| 6,197,710 | B1 | * | 3/2001 | Ohara et al. | 501/4 |
| 6,635,591 | B2 | * | 10/2003 | Nagata et al. | 501/3 |
| 6,673,729 | B2 | * | 1/2004 | Siebers et al. | 501/4 |
| 6,750,167 | B2 | * | 6/2004 | Kitamura et al. | 501/4 |
| 7,071,132 | B2 | * | 7/2006 | Minamikawa et al. | 501/4 |
| 7,091,141 | B2 | * | 8/2006 | Horsfall et al. | 501/4 |
| 7,148,164 | B2 | * | 12/2006 | Minamikawa et al. | 501/4 |
| 7,220,690 | B2 | * | 5/2007 | Mitra et al. | 501/4 |
| 7,226,881 | B2 | * | 6/2007 | Goto | 501/4 |
| 7,473,660 | B2 | * | 1/2009 | Comte | 501/4 |

(Continued)

FOREIGN PATENT DOCUMENTS

| EP | 1 291 328 A1 | 3/2003 |
| EP | 1 435 343 A1 | 7/2004 |
| JP | 63242945 | * 10/1988 |
| JP | 08133783 | * 5/1996 |

OTHER PUBLICATIONS

European Search Report dated Feb. 13, 2008, issued in corresponding European patent application No. 07 01 0988.

(Continued)

*Primary Examiner*—Karl E Group
(74) *Attorney, Agent, or Firm*—Westerman, Hattori, Daniels & Adrian, LLP

(57) ABSTRACT

Provided are $SiO_2$—$Al_2O_3$-based or $Li_2O$—$Al_2O_3$—$SiO_2$-based crystallized glass that solves the cause of cracking and fracture in forming it into large-size shaped articles, that has homogeneous inner quality and that may be produced stably at high efficiency; and a method for producing it. The crystallized glass contains components of $SiO_2$ and $Al_2O_3$, wherein the crystal precipitation peak temperature width obtained in differential thermal analysis of amorphous glass, a precursor thereof, is at least 22° C. Preferably, the total amount of the $TiO_2$ component and the $ZrO_2$ component in the crystallized glass is within a range of from 3.0 to less than 4.3%. FIG. 1 is referred to.

20 Claims, 3 Drawing Sheets

U.S. PATENT DOCUMENTS

| | | | |
|---|---|---|---|
| 2002/0022564 A1* | 2/2002 | Minamikawa et al. | 501/4 |
| 2003/0054935 A1 | 3/2003 | Kitamura et al. | |
| 2004/0198579 A1 | 10/2004 | Horsfall et al. | |
| 2005/0065011 A1* | 3/2005 | Goto | 501/4 |
| 2007/0093375 A1* | 4/2007 | Nakajima | 501/4 |
| 2007/0293386 A1* | 12/2007 | Goto | 501/4 |

OTHER PUBLICATIONS

Patent Abstract of Japan, Publication No. 02-233533, published on Sep. 17, 1990.

Patent Abstract of Japan, Publication No. 07-172862, published on Jul. 11, 1995.

Patent Abstract of Japan, Publication No. 07-187710, published on Jul. 25, 1995.

Patent Abstract of Japan, Publication No. 08-133783, published on May 28, 1996.

Patent Abstract of Japan, Publication No. 2005-089272, published on Apr. 7, 2005.

* cited by examiner

CRYSTALLIZED GLASS, AND METHOD FOR PRODUCING CRYSTALLIZED GLASS

BACKGROUND OF THE INVENTION

1. Field of the Invention

The present invention relates to $SiO_2$—$Al_2O_3$-based or $Li_2O$—$Al_2O_3$—$SiO_2$-based crystallized glass, and to a method for producing it. In particular, the invention relates to such crystallized glass that has wide-range applications as various precision parts severely required to have ultra-low expansion characteristics, ultra-surface-smoothness and high rigidity and that is favorable for various constitutive parts of next-generation semiconductor production devices, and relates to a method for producing it.

2. Background Art $SiO_2$—$Al_2O_3$-based or $Li_2O$—$Al_2O_3$—$SiO_2$-based crystallized glass may be made to have, for example, low-expansion characteristics (e.g., see Patent Reference 1, Patent Reference 2); and in addition, it has other useful physical properties intrinsic to crystallized glass of the type, such as high rigidity, and ultra-surface-smoothness after polished.

On the other hand, when $SiO_2$—$Al_2O_3$-based or $Li_2O$—$Al_2O_3$—$SiO_2$-based crystallized glass is formed into large-size shaped articles, then it has some problems in that it may be often cracked or fractured in a step of thermal treatment of the precursor glass for crystal precipitation or in a step of crystal growth in the process of producing the glass articles; and the efficiency in production of large-size shaped articles of crystallized glass of the type is extremely low.

Patent Reference 3 discloses partially-crystallizing glass solder, of which the main crystal phase comprises a β-quartz mixed crystal phase. This reference says that the maximum value of an exothermic peak, the peak height and the peak area obtained in differential thermal analysis (DTA) give qualitative information relating to crystallization characteristics.

Patent Reference 4 discloses crystallized glass of which the main crystal phase is lithium disilicate, describing the profile of exothermic peaks observed in differential thermal analysis (DTA) and the stress occurring in crystallized glass.

However, these references do not concretely suggest anything about the type of profile of the exothermic peak curve of $SiO_2$—$Al_2O_3$-based or $Li_2O$—$Al_2O_3$—$SiO_2$-based crystallized glass for solving the above-mentioned problems of cracking or fracture of the glass.

Patent Reference 1: JP-A-8-133783
Patent Reference 2: JP-A-2005-89272
Patent Reference 3: JP-A-59-174543
Patent Reference 4: JP-A-7-187710

SUMMARY OF THE INVENTION

An object of the invention is to provide $SiO_2$—$Al_2O_3$-based or $Li_2O$—$Al_2O_3$—$SiO_2$-based crystallized glass that solves the cause of cracking and fracture in forming it into large-size shaped articles, that has homogeneous inner quality and that may be produced stably at high efficiency; and to provide a method for producing it.

Another object of the invention is to provide crystallized glass that solves the above-mentioned problems and has ultra-low-expansion characteristics, and to provide a method for producing it.

We, the present inventors have assiduously studied for the purpose of attaining the above-mentioned objects and, as a result, have found that, when the crystal precipitation peak temperature width obtained in differential thermal analysis of amorphous glass, a precursor of $SiO_2$—$Al_2O_3$-based or $Li_2O$—$Al_2O_3$—$SiO_2$-based crystallized glass, is at least 22° C., then crystallized glass can be obtained that may be formed into large-size materials (having a volume of at least 1 m³) with neither cracking nor fracture, and thus have reached the present invention. In particular, the crystallized glass of the invention can have ultra-low-expansion characteristics, and further can be transparent.

Specifically, preferred embodiments of the invention are represented by any of the following constitutions.

(Constitution 1)
Crystallized glass containing components of $SiO_2$ and $Al_2O_3$ (as oxides), wherein the crystal precipitation peak temperature width obtained in differential thermal analysis of amorphous glass, a precursor thereof, is at least 22° C.

(Constitution 2)
Crystallized glass of the constitution 1, wherein the crystal precipitation peak temperature width is at least 22° C. and at most 45° C.

(Constitution 3)
Crystallized glass of the constitution 1 or 2, which further contains an $Li_2O$ component (as oxide).

(Constitution 4)
Crystallized glass of any of the constitutions 1 to 3, wherein the crystal precipitation peak temperature obtained in differential thermal analysis of amorphous glass, the precursor, is within a range of from 950° C. to 1050° C.

(Constitution 5)
Crystallized glass of any of the constitutions 1 to 4, which contains a $TiO_2$ component (as oxide) and a $ZrO_2$ component (as oxide) and wherein the total of the $TiO_2$ component and the $ZrO_2$ component is within a range of from 3.0% to less than 4.3% in terms of percent by mass of the oxide.

(Constitution 6)
Crystallized glass of any of the constitutions 1 to 5, wherein the content of the $TiO_2$ component is within a range of from 1.6 to 3.0% and the content of the $ZrO_2$ component is within a range of from 1.3 to 2.5%, in terms of percent by mass of the oxide.

(Constitution 7)
Crystallized glass of any of the constitutions 1 to 6, which contains β-quartz (β-$SiO_2$) and/or β-quartz solid solution (β-$SiO_2$ solid solution) as the main crystal phase thereof.

(Constitution 8)
Crystallized glass of any of the constitutions 1 to 7, wherein the amount of the OH molecules contained in amorphous glass, the precursor of crystallized glass, is at most 700 ppm.

(Constitution 9)
Crystallized glass of any of the constitutions 1 to 8, wherein the mean crystal particle size of the precipitated crystal phase is within a range of from 5 to 200 nm.

(Constitution 10)
Crystallized glass of any of the constitutions 1 to 9, wherein the maximum temperature in thermal treatment for crystallization is from 750 to 850° C.

(Constitution 11)
Crystallized glass of any of the constitutions 1 to 10, of which the average linear thermal expansion coefficient within a temperature range of from 0 to 50° C. is within 0.0±0.5 ($10^{-7}$° $C.^{-1}$) and (maximum value−minimum value) of ΔL/L is within a range of $10×10^{-7}$ which contains $SiO_2$, $Al_2O_3$ and $P_2O_5$, and wherein the total amount of these components is from 86.0 to 89.0% by mass.

(Constitution 12)

Crystallized glass of any of the constitutions 1 to 11, obtained through thermal treatment for crystallization of starting glass that contains the following components each within the range in terms of percent by mass of the oxide:

$SiO_2$, from 50 to 62%;
$P_2O_5$, from 5 to 10%;
$Al_2O_3$, from 22 to 26%.

(Constitution 13)

Crystallized glass of the constitution 12, wherein the ratio of the $P_2O_5$ component to the $SiO_2$ component and to the $Al_2O_3$ component is as follows, in terms of percent by mass of the oxide:

$P_2O_5/SiO_2$, from 0.1495 to 0.1720;
$P_2O_5/Al_2O_3$, from 0.330 to 0.390.

(Constitution 14)

Crystallized glass of the constitution 12 or 13, wherein the content of the $SiO_2$ component, the $Al_2O_3$ component and the $P_2O_5$ component is as follows, in terms of percent by mass of the oxide:

$SiO_2+Al_2O_3+P_2O_5$=from 86.0 to 89.0%.

(Constitution 15)

Crystallized glass of any of the constitutions 1 to 14, which contains the $Li_2O$ component in an amount of from 3 to 5% in terms of percent by mass of the oxide.

(Constitution 16)

Crystallized glass of any of the constitutions 1 to 15, which contains the following components in the amount indicated below in terms of percent by mass of the oxide:

MgO, from 0 to 4% and/or
ZnO, from 0 to 4% and/or
CaO, from 0 to 4% and/or
BaO, from 0 to 4%.

(Constitution 17)

Crystallized glass of any of the constitutions 1 to 16, which contains the following components in the amount indicated below in terms of percent by mass of the oxide:

$SnO_2$, from 0.01 to 5.0% and/or
$CeO_2$, from 0.01 to 5.0%.

(Constitution 18)

Crystallized glass of any of the constitutions 1 to 17, which contains at least one or more components selected from a fluoride component, a sulfate component, a chloride component, an $MnO_2$ component (as oxide), a $WO_3$ component (as oxide), a $Ta_2O_5$ component (as oxide) and an $Nb_2O_5$ component (as oxide).

(Constitution 19)

Crystallized glass of any of the constitutions 1 to 18, which does not substantially contain PbO, $Na_2O$ and $K_2O$ components (as oxides).

(Constitution 20)

A mask for lithography, comprising crystallized glass of any of the constitutions 1 to 19.

(Constitution 21)

An optical reflection mirror for lithography, comprising crystallized glass of any of the constitutions 1 to 19.

(Constitution 22)

A wafer stage or reticule stage for lithography, comprising crystallized glass of any of the constitutions 1 to 19.

(Constitution 23)

A part of precision instruments, comprising crystallized glass of any of the constitutions 1 to 19.

(Constitution 24)

A method for producing crystallized glass comprising melting an amorphous glass material, shaping the melted amorphous glass material and then heat-treating it to obtain crystallized glass; wherein the amorphous glass contains $SiO_2$, $Al_2O_3$, $TiO_2$ and $ZrO_2$ components (as oxides) and wherein the total amount of the $TiO_2$ component and the $ZrO_2$ component is from 3.0 to less than 4.3% in terms of percent by mass of the oxide.

(Constitution 25)

The method for producing crystallized glass of the constitution 24, wherein the amorphous glass further contains an $Li_2O$ component (as oxide).

(Constitution 26)

The method for producing crystallized glass of the constitution 24 or 25, wherein the content of the $TiO_2$ component in the amorphous glass is within a range of from 1.6 to 3.0% in terms of percent by mass of the oxide and the content of the $ZrO_2$ component is within a range of from 1.3 to 2.5%.

In the above-mentioned constitutions, the constitutive components of the composition are expressed in terms of % by mass of the oxide thereof and therefore, though they could not be directly expressed, but for the purpose of attaining the same results as in the above-mentioned constitutions, their content may fall nearly within the range mentioned below in terms of % by mol.

(Constitution 27)

Crystallized glass of any of the constitutions 1 to 4, which contains a $TiO_2$ component and a $ZrO_2$ component and wherein the total of the $TiO_2$ component and the $ZrO_2$ component is within a range of from 2.0% to less than 3.2% in terms of percent by mol.

(Constitution 28)

Crystallized glass of any of the constitutions 1 to 5, wherein the content of the $TiO_2$ component is within a range of from 1.3 to 2.2% in terms of percent by mol and the content of the $ZrO_2$ component is within a range of 0.7 to 1.2%.

(Constitution 29)

Crystallized glass of any of the constitutions 1 to 11, which is obtained through heat treatment for crystallization of glass material that contains the following components each in the amount indicated below in terms of percent by mol:

$SiO_2$, from 57 to 70%,
$P_2O_5$, from 2 to 5%,
$Al_2O_3$, from 13 to 18%.

(Constitution 30)

Crystallized glass of any of the constitutions 1 to 11, which contains an $Li_2O$ component in an amount within a range of from 7 to 11 percent by mol.

(Constitution 31)

Crystallized glass of any of the constitutions 1 to 15, which contains the following components each within the range indicated below in terms of percent by mol:

MgO, from 0 to 3.5% and/or
ZnO, from 0 to 2.0% and/or
CaO, from 0 to 5.0% and/or
BaO, from 0 to 2.0%.

(Constitution 32)

Crystallized glass of any of the constitutions 1 to 16, which contains the following components each within the range indicated below in terms of percent by mol:
SnO$_2$, from 0.005 to 2.5% and/or
CeO$_2$, from 0.005 to 2.5%.

The invention provides SiO$_2$—Al$_2$O$_3$-based or Li$_2$O—Al$_2$O$_3$—SiO$_2$-based crystallized glass capable of being formed into large-size shaped articles at high efficiency with neither cracking nor fracture during the process of producing them; and provides a method for producing it.

A preferred embodiment of the invention provides SiO$_2$—Al$_2$O$_3$-based or Li$_2$O—Al$_2$O$_3$—SiO$_2$-based crystallized glass of which the average linear thermal expansion coefficient within a temperature range of from 0 to 50° C. is within 0.0±0.5 (10$^{-7}$ ° C.$^{-1}$) and (maximum value−minimum value) of ΔL/L is within a range of 10×10$^{-7}$; and provides a method for producing it.

Another preferred embodiment of the invention provides crystallized glass which comprises fine crystal particles having a mean crystal particle size of from 5 nm to 200 nm, which has ultra-surface-smoothness having a surface roughness Ra after polishing of at most 3 angstroms, and which is free from ion diffusion of PbO, Na$_2$O and K$_2$O components; and provides a method for producing it.

DETAILED DESCRIPTION OF THE INVENTION

Figure 1:
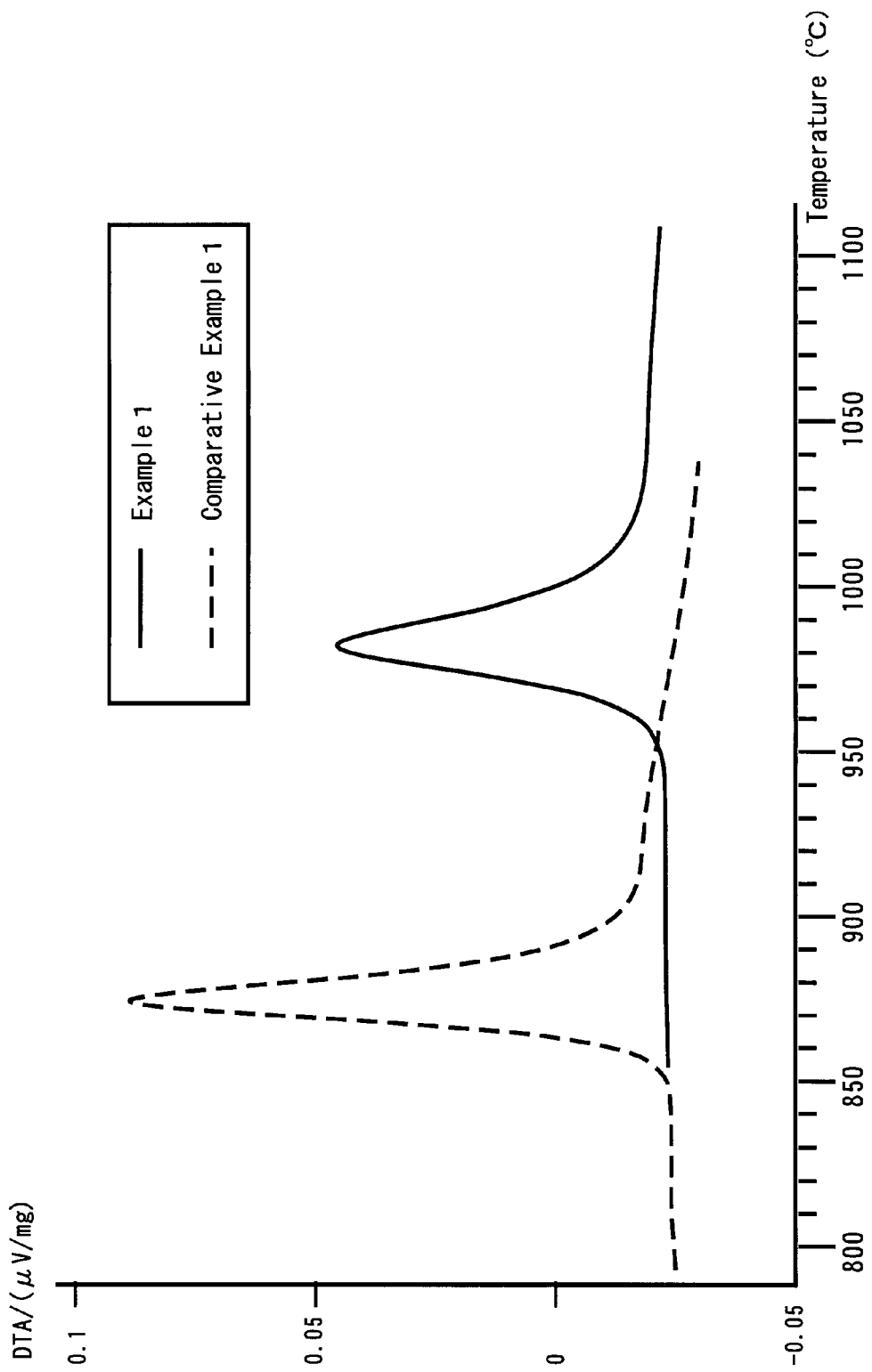
FIG. 1 shows a DTA curve of Example 1 and that of Comparative Example 1.

Preferred embodiments of the crystallized glass of the invention are described below. Not specifically indicated, the constitutive components are expressed as the oxide thereof, and the content of each component is expressed in terms of percent by mass of the oxide.

The expression "as oxide" as referred to in this description means a method of expressing the constitutive component in the crystallized glass of the invention, which is as follows: Of the constitutive components of the crystallized glass of the invention, the composite salts and others except the fluoride component, the sulfate component and the chloride component are presumed to be all decomposed into their oxides during the step of melting the glass material, and each constitutive component of the crystallized glass is expressed as the oxide thereof. Regarding its content, each constitutive component of the crystallized glass is expressed in terms of percent by mass of the oxide, relative to the overall weight of the expressed oxides, 100% by mass, in the glass.

One characteristic feature of the SiO$_2$—Al$_2$O$_3$-based or Li$_2$O—Al$_2$O$_3$—SiO$_2$-based crystallized glass is its low expansion property. The SiO$_2$—Al$_2$O$_3$-based or Li$_2$O—Al$_2$O$_3$—SiO$_2$-based crystallized glass may satisfy its low expansion property when it has a specifically-defined composition of itself. The constitutive members used in the next-generation lithography technology in semiconductor production are required to have thermal dimensional stability, strength, thermal durability and chemical stability; and in particular, they are required to have ultra-low expansion characteristics that are necessary for the thermal expansion stability. Taking advantage of the low expansion property thereof, use of SiO$_2$—Al$_2$O$_3$-based or Li$_2$O—Al$_2$O$_3$—SiO$_2$-based crystallized glass in the above-mentioned constitutive members is investigated.

In its preferred embodiment, the SiO$_2$—Al$_2$O$_3$-based or Li$_2$O—Al$_2$O$_3$—SiO$_2$-based crystallized glass may have a smooth surface, after polished, that is applicable to the next-generation lithography, and this is another characteristic feature of the crystallized glass.

Crystallized glass may be produced through thermal treatment of its precursor, amorphous glass by forming fine crystals in the heat-treated amorphous glass. When a large-size material is formed of the crystallized glass, the formation of the fine crystals may fluctuate owing to the temperature difference between the inside and the outside in the crystallization step, and it induces an expansion difference inside the crystallized glass, thereby causing cracking. This phenomenon appears remarkably in the above-mentioned SiO$_2$—Al$_2$O$_3$-based or Li$_2$O—Al$_2$O$_3$—SiO$_2$-based crystallized glass having an ultra-low expansion characteristic.

For preventing it, it is desirable that the crystal precipitation peak temperature width in differential thermal analysis (DTA) of the amorphous glass is at least 22° C.

When the crystal precipitation peak temperature width in differential thermal analysis (DTA) of the precursor, amorphous glass is broad, then the crystal precipitation during the heat-treatment step may occur gently taking a certain width of time in some degree, and therefore the expansion difference inside the shaped article may be reduced. On the contrary, when the peak temperature width is narrow, then the crystals may precipitate rapidly within a short period of time, and therefore the expansion difference in the shaped article may be large.

Next, from the viewpoint of the necessary time for the production, when the peak temperature width is broad, then the crystallization step takes a long period of time; but when the peak temperature width is narrow, then the time for the crystallization step may be short.

Taking the above into consideration, we, the present inventors have clarified that, when the peak temperature width is at least 22° C., then the time to be taken for the production of a large-sized shaped article of SiO$_2$—Al$_2$O$_3$-based or Li$_2$O—Al$_2$O$_3$—SiO$_2$-based crystallized glass may be shortened as much as possible and the article is neither cracked nor fractured. For more surely preventing the cracking and the fracture, the peak temperature width is preferably at least 23° C., most preferably at least 24° C. For the purpose of shortening the production time as much as possible, the peak temperature width is preferably at most 45° C., more preferably at most 43° C., most preferably at most 41° C. When the glass has plural main crystal phases and has plural crystal precipitation peak temperatures, then at least one of the corresponding crystal precipitation peak temperature width may be within the above-mentioned range, and more preferably, the crystal precipitation peak temperature width of the crystal precipitation peak temperature corresponding to the major main crystal phase having the largest precipitation proportion falls within the above-mentioned range.

For preventing the cracking to be caused by the expansion difference inside the crystallized glass, it is desirable that the lowermost limit of the crystal precipitation peak temperature in differential thermal analysis (DTA) of the precursor, amorphous glass is 950° C., more preferably 960° C., most preferably 970° C. Similarly, for preventing the cracking to be caused by the expansion difference inside the crystallized glass, it is desirable that the uppermost limit of the crystal precipitation peak temperature in differential thermal analysis (DTA) of the precursor, amorphous glass is 1050° C., more preferably 1030° C., most preferably 1010° C.

The crystal precipitation peak temperature, or the crystal precipitation peak temperature in differential thermal analysis (DTA) as referred to in this description is meant to indicate the temperature in the temperature-exothermic energy change curve obtained in differential thermal analysis of glass (heating speed, 10° C./min.), at which the exothermic energy corresponding to the crystal precipitation of the main crystal phase is the largest value.

The exothermic peak energy is the absolute value of the difference between the standard energy value and the exothermic energy at the crystal precipitation peak temperature. The standard energy value as referred to herein means the energy value indicated by the intersection of the straight line formed by connecting the inflection points first appearing on the low-temperature side and on the high-temperature side from the maximum value of the exothermic energy corresponding to the crystal precipitation of the main crystal phase in the above-mentioned temperature-exothermic energy change curve, and the crystal precipitation peak temperature.

Figure 2:
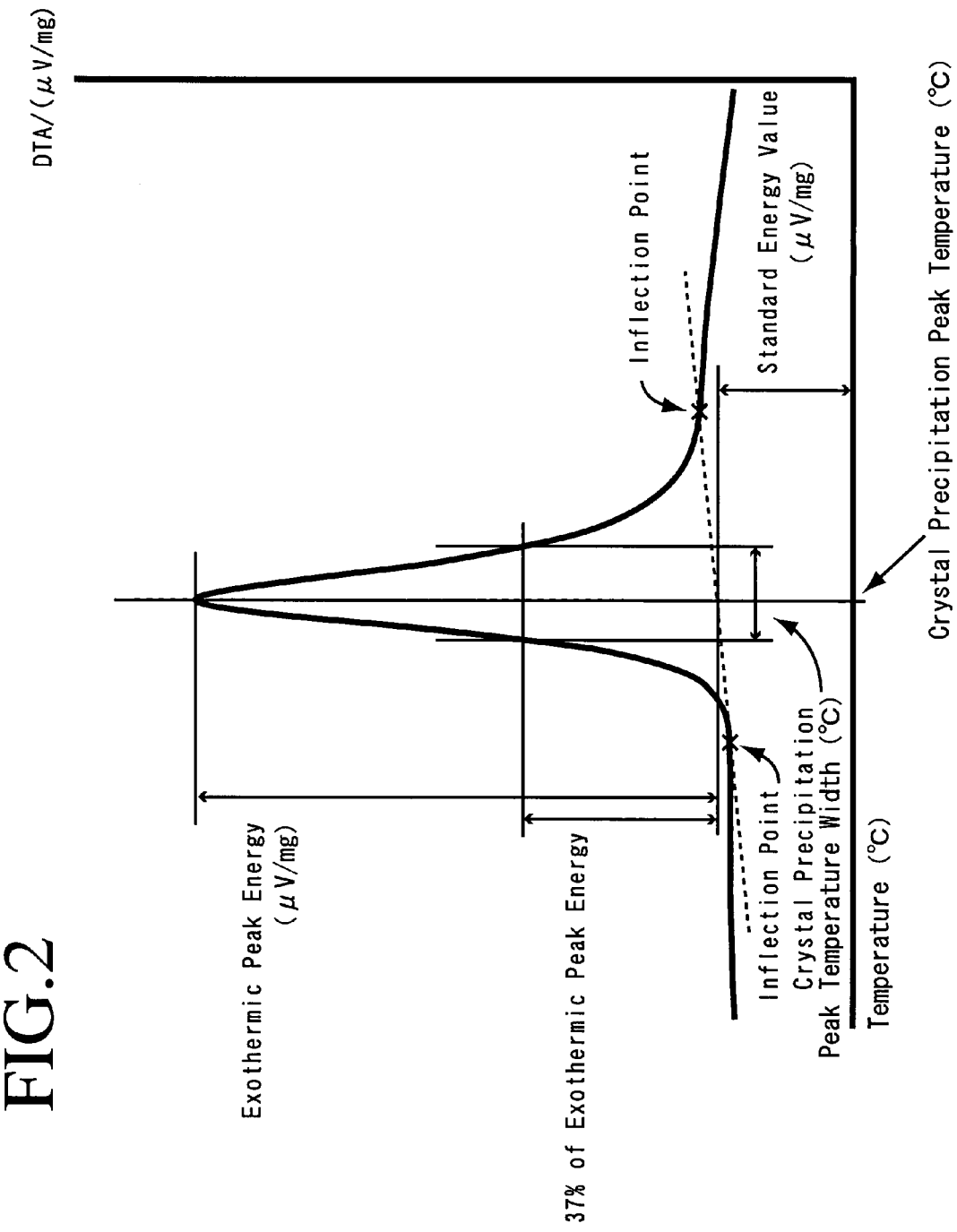
FIG. 2 shows a crystal precipitation peak temperature and a method of computation of a crystal precipitation peak temperature width in a DTA curve.
Figure 3:
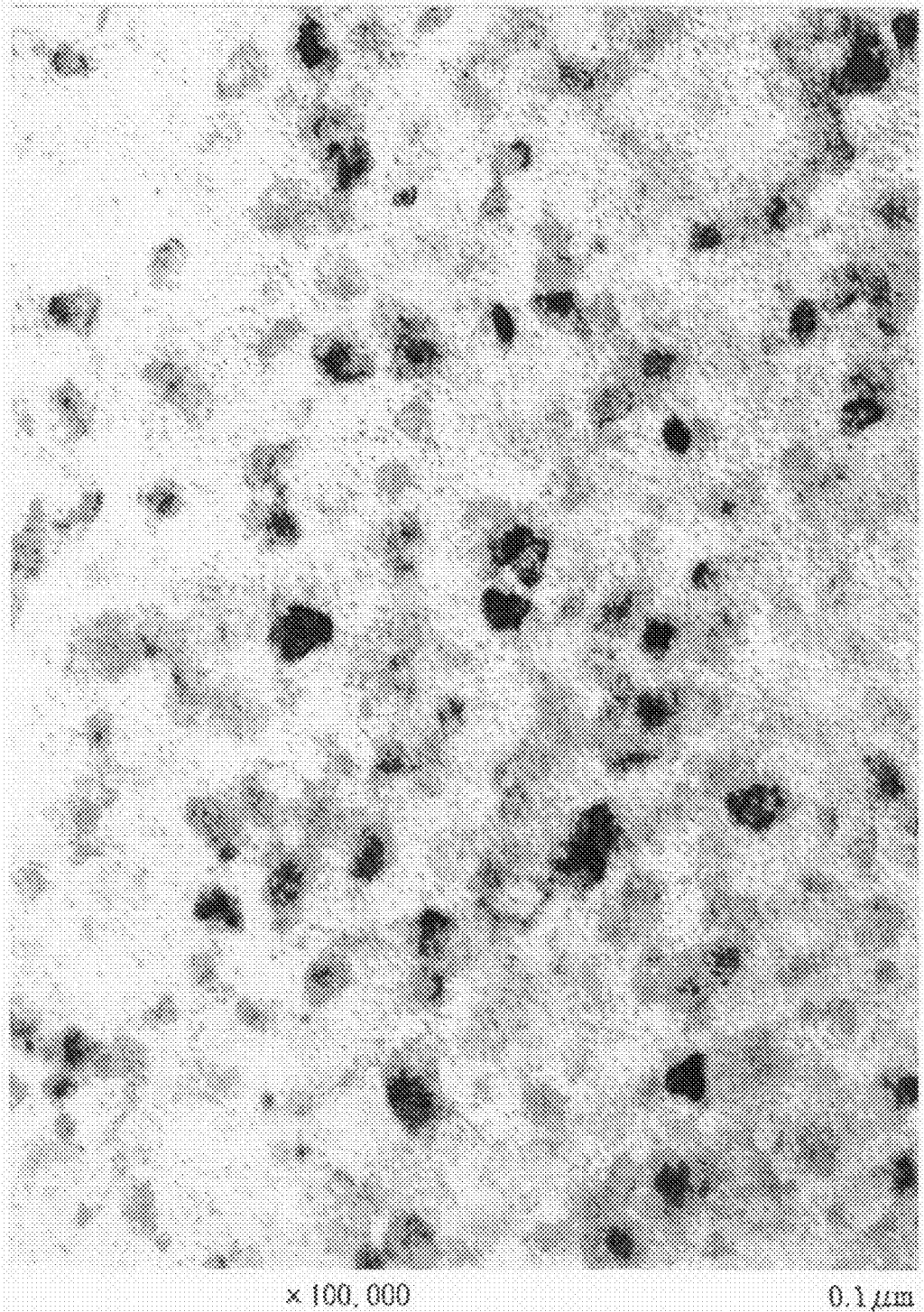
FIG. 3 is a photographic picture of the fine structure in Example 1 taken with a transmission electronic microscope.

The crystal precipitation peak temperature width (this may be simply referred to as peak temperature width) means the difference between the temperatures on the low-temperature side and on the high-temperature side from the crystal precipitation peak temperature in the above-mentioned temperature-exothermic energy change curve, at which the energy increase from the standard energy value is 37% of the exothermic peak energy. (See FIG. 2.)

"Crystallized glass" as referred to in this description means a material obtained through heat treatment of glass for crystal precipitation in the glass phase, and this material comprises amorphous solid and crystal.

"Mean crystal particle size" as referred to in this description means a mean value of the crystal particle size determined through visual measurement on a photographic picture taken with a transmission electronic microscopic. The number of particles to be visually analyzed is at least 30. The crystal particle size is measured in a predetermined direction of a particle in the field of view, and this is the distance between the two parallel lines that sandwich the crystal particle.

"Maximum value−minimum value of $\Delta L/L$" as referred to in this description is meant to indicate the difference between the maximum value and the minimum value of $\Delta L/L$ wherein L means the length of the crystallized glass at 0° C. and $\Delta L$ means a length change of the crystallized glass at any other temperature, within the temperature range.

The ultra-low expansion characteristic as referred to in this description means that, within the temperature range of 0° C. to 50° C., the average linear thermal expansion coefficient ($\alpha$) is within a range of $0.0\pm0.5$ ($10^{-7}$° C.$^{-1}$) and the (maximum value−minimum value) of $\Delta L/L$ is within a range of $10\times10^{-7}$; preferably the average linear thermal expansion coefficient is within a range of $0.0\pm0.2$ ($10^{-7}$° C.$^{-1}$) and the (maximum value−minimum value) of $\Delta L/L$ is within a range of $10\times10^{-7}$; more preferably the average linear thermal expansion coefficient is within a range of $0.0\pm0.1$ ($10^{-7}$° C.$^{-1}$) and the (maximum value−minimum value) of $\Delta L/L$ is within a range of $8\times10^{-7}$.

The main crystal phase as referred to in this description is meant to indicate all the crystal phases having a relatively large precipitation ratio. In other words, in an X-ray chart of X-ray diffractiometry (the vertical axis indicates the X-ray diffraction strength, and the horizontal axis indicates the diffraction angle), when the ratio of the X-ray diffraction strength at the main peak of a precipitation phase (the highest peak of the crystal phase) to the X-ray diffraction strength at the main peak (the highest peak) of the crystal phase having a largest precipitation proportion, set as 100, is at least 30 (the ratio is hereinafter referred to as X-ray strength ratio), then all the crystal phases satisfying this are the main crystal phases. Preferably, the X-ray strength ratio of the crystal phases except the main crystal phase is less than 20, more preferably less than 10, most preferably less than 5.

The $TiO_2$ component and/or the $ZrO_2$ component are both components useful as a crystal-nucleating agent, and these are effective for controlling the thermal characteristics of the crystal glass expressed by differential thermal analysis.

When the lowermost limit of the total of the $TiO_2$ component and the $ZrO_2$ component is 3.0%, then the peak temperature width may be readily controlled to fall within the above-mentioned range; and when it is 3.2%, then the effect is larger; and when it is 3.3%, then the effect is the largest. Similarly, when the uppermost limit of the $TiO_2$ component and the $ZrO_2$ component is less than 4.3%, then the peak temperature width may be readily controlled to fall within the above-mentioned range; and when it is 4.2%, then the effect is larger; and when it is 4.1%, then the effect is the largest.

Controlling the content of each of the $TiO_2$ component and the $ZrO_2$ component further enlarges the above-mentioned effect.

When the lowermost limit of the content of the $TiO_2$ component is 1.6%, then the peak temperature width may be more readily controlled to fall within the above-mentioned range; and when it is 1.8%, then the effect is larger; and when it is 2.0%, then the effect is the largest.

When the uppermost limit of the content of the $TiO_2$ component is 3.0%, then the peak temperature width may be more readily controlled to fall within the above-mentioned range; and when it is 2.7%, then the effect is larger; and when it is 2.5%, then the effect is the largest.

When the lowermost limit of the content of the $ZrO_2$ component is 1.3%, then the peak temperature width may be more readily controlled to fall within the above-mentioned range; and when it is 1.4%, then the effect is larger; and when it is 1.45%, then the effect is the largest. When the uppermost limit of the content of the $ZrO_2$ component is 2.5%, then the peak temperature width may be more readily controlled to fall within the above-mentioned range; and when it is 2.0%, then the effect is larger; and when it is 1.8%, then the effect is the largest.

For heating the melting device in shaping amorphous glass into a large-size article, employable is a melting system according to an indirect heating method that uses a gas or oxygen burner or a direct electric method that uses an electrode. When the indirect heating method that uses a gas or oxygen burner is employed, then water existing in the gas may mix into the glass melt, thereby increasing the OH molecule concentration in glass. The OH molecule concentration increase may tend to lower the crystallization peak temperature in differential thermal analysis, and additionally may tend to reduce the crystallization peak temperature width, therefore resulting in that the glass may be readily cracked during the process of its crystallization. For preventing the cracking, it is desirable that the amount of the OH molecules in the amorphous glass is at most 700 ppm, more preferably at most 680 ppm, most preferably at most 660 ppm. Not specifically defined, the lowermost limit of the amount of the OH molecules may be inevitably about 10 ppm or so to remain in the crystallized glass.

In order to make the amount of the OH molecules fall within the above-mentioned range, it is desirable that the glass material is melted according to a direct electric method, not according to the indirect heating method that uses a gas or oxygen burner.

Regarding the average linear thermal expansion coefficient, the materials in the field of various semiconductor production devices and ultra-precision members are required to have thermal expansion characteristics enough for those precision instruments. To satisfy the requirements, it is desirable that the average linear thermal expansion coefficient, $\alpha$, within a temperature range of from 0 to 50° C. is at most $0.0\pm0.5$ ($10^{-7\circ}$ $C.^{-1}$), more preferably at most $0.0\pm0.4$ ($10^{-7\circ}$ $C.^{-1}$). In a preferred embodiment of the crystallized glass of the invention, the average linear thermal expansion coefficient falls within the above-mentioned range. The composition of the constitutive components of the crystallized glass that has relation to the physical properties is controlled to fall within the range mentioned hereinunder, whereby the glass may readily have the physical property value, $\alpha$, of at most $0.0\pm0.5$ ($10^{-7\circ}$ $C.^{-1}$); and when the composition is controlled more, then the glass may be more readily have the physical property value, $\alpha$, of at most $0.0\pm0.1$ ($10^{-7\circ}$ $C.^{-1}$).

Unless otherwise specifically indicated in this description, the average linear thermal expansion coefficient is expressed as a unit of ($10^{-7\circ}$ $C.^{-1}$).

Also similarly, in order that a glass material may have thermal expansion characteristics enough for precision instruments, it is desirable that the (maximum value−minimum value) of $\Delta L/L$ within a temperature range of from 0 to 50° C. is within a range of at most $10\times10^{-7}$. In a preferred embodiment of the crystallized glass of the invention, the (maximum value−minimum value) of $\Delta L/L$ falls within the above-mentioned range. More preferably, the (maximum value−minimum value) of $\Delta L/L$ is within a range of at most $9\times10^{-7}$. By controlling the condition for thermal treatment for crystallization thereof, the crystallized glass of the invention may readily satisfy the physical requirement, (maximum value−minimum value) of $\Delta L/L$ falling within a range of at most $9\times10^{-7}$. By more strictly controlling the condition for thermal treatment for crystallization thereof, the crystallized glass may readily satisfy the physical requirement, (maximum value−minimum value) of $\Delta L/L$ falling within a range of at most $8\times10^{-7}$.

The surface roughness after polishing and the precipitated crystal size are described. In the field of various semiconductor production devices and ultra-precision members, the smoothness of the substrate surface enough for those precision instruments is important. For attaining the surface smoothness, the relation between the mean crystal particle size and the surface roughness should be specifically noted. When the application of the crystallized glass of the invention to the field of various semiconductor production devices and ultra-precision members is taken into consideration, the surface roughness, Ra, after polishing of the glass is preferably at most 3 angstroms, more preferably at most 2 angstroms. For easily attaining the surface smoothness, it is desirable that the mean crystal particle diameter of the precipitated crystals of the material is at most 200 nm, more preferably at most 90 nm, most preferably at most 80 nm. On the other hand, in order to make the mechanical strength of the crystallized glass fall within a desired range, the mean crystal particle diameter is preferably at least 5 nm, more preferably at least 50 nm, most preferably at least 60 nm. When the composition of the constitutive components of the crystallized glass that has relation to the precipitated crystal size is controlled to fall within a range mentioned below and when the crystallization condition is suitably controlled, then the crystallized glass may readily have the surface roughness value Ra after polishing and the mean crystal particle size each falling within the range as above.

The crystallized glass of the invention may have the intended low-expansion characteristics through precipitation of the main crystal phase having a negative average linear thermal expansion coefficient thereby making the positive expansion coefficient of the glass phase offset the negative expansion coefficient of the crystal phase. In order that the crystallized glass may have ultra-low expansion characteristics, it is desirable that the main crystal phase of the glass contains β-quartz ($\beta$-$SiO_2$) and/or β-quartz solid solution ($\beta$-$SiO_2$ solid solution). When the composition of the constitutive components of the crystallized glass that has relation to the precipitated crystal phase is controlled to fall within the range mentioned below and when the crystallization condition is suitably controlled, then the crystallized glass may more readily have the intended ultra-low expansion characteristics. The β-quartz solid solution as referred to in this description is meant to indicate an interstitial one with any other elements than Si and O and intercalated into β-quartz and/or a substitutional one with such elements substituted therein. Especially preferred is a crystalline body having $Al^{+3}$ as substituted for $Si^{+4}$ and having $Li^+$, $Mg^{+2}$ and $Zn^{+2}$ added thereto for the equivalence thereof. (One typical example is β-eucryptite.)

The $SiO_2$ component is a component having relation to the precipitation of the β-quartz and β-quartz solid solution as the main crystal phase through thermal treatment of a glass material; and when its amount is at least 50%, then the precipitated crystal of the obtained, crystallized glass may be stable and its structure is hardly coarsened with the result that the mechanical strength of the glass is increased and the surface roughness thereof, after polished, may be reduced. When the amount is at most 62%, then the glass material may be readily melted and shaped and the shaped article may have improved homogeneousness. For more readily attaining the above-mentioned effect, the lowermost limit of the component amount is more preferably 54%, most preferably 54.5%. The uppermost limit of the component amount is more preferably 56%, most preferably 55.8%.

The $P_2O_5$ component has an effect of improving the meltability and the clearness of the glass material, and an effect of stabilizing the thermal expansion after the thermal treatment for crystallization to be a desired value. When this is combined with the $SiO_2$ component, its effects may be enhanced more. In the crystallized glass of the invention, when the amount of the $P_2O_5$ component is at least 5%, then the above-mentioned effects may be greatly enhanced; and when it is at most 10%, then the devitrification resistance of the glass material is bettered and the structure of the precipitated crystal is prevented from being coarsened during the crystallization stage owing to the reduction in the devitrification resistance, therefore resulting in the increase in the mechanical strength of the crystallized glass. For more readily attaining the above-mentioned effects, the lowermost limit of the component amount is more preferably 7.3%, most preferably 7.4%. Similarly, for more readily attaining the effects, the uppermost limit of the component amount is more preferably 8.7%, most preferably 8.5%.

When the amount of the $Al_2O_3$ component is at least 22%, then the glass material may be readily melted, and therefore the homogeneousness of the obtained, crystallized glass may be bettered and further the chemical durability of the crystallized glass is also bettered. When the amount is at most 26%, then the devitrification resistance of the glass material is bettered and the structure of the precipitated crystal is prevented from being coarsened during the crystallization stage owing to the reduction in the devitrification resistance, therefore resulting in the increase in the mechanical strength of the crystallized glass.

For more readily attaining the above-mentioned effects, the lowermost limit of the component amount is more preferably 24%, most preferably 24.2%. Similarly, for more readily attaining the effects, the uppermost limit of the component amount is more preferably 25%, most preferably 24.7%.

Further, in case where the crystallized glass satisfies any one or two or more of the conditions that $SiO_2+Al_2O_3+P_2O_5=$ from 86.0 to 89.0%, that the ratio of the $P_2O_5$ component to the $SiO_2$ component in terms of percent by mass, $P_2O_5/SiO_2=$ from 0.1495 to 0.1720, and that the ratio of the $P_2O_5$ component to the $Al_2O_3$ component in terms of percent by mass, $P_2O_5/Al_2O_3=$ from 0.330 to 0.390 are satisfied, then its low-expansion property may be readily improved significantly and the glass may readily have ultra-low expansion characteristics within a temperature range of from 0° C. to 50° C. when the total of the $TiO_2$ component and the $ZrO_2$ component is within a range of from 3.0% to less than 4.3%.

For more readily attaining the above-mentioned effects, the lowermost limit of the content of $SiO_2+Al_2O_3+P_2O_5$ is more preferably 86.7%, most preferably 86.8%. Similarly, for more readily attaining the effects, the uppermost limit of the content of $SiO_2+Al_2O_3+P_2O_5$ is more preferably 88.0%, most preferably 87.6%.

For more readily attaining the above-mentioned effects, the lowermost limit of $P_2O_5/SiO_2$ is more preferably 0.1500, most preferably 0.1505. Similarly for more readily attaining the effects, the uppermost limit of $P_2O_5/SiO_2$ is more preferably 0.1660, most preferably 0.1600.

For more readily attaining the above-mentioned effects, the lowermost limit of $P_2O_5/Al_2O_3$ is more preferably 0.335, most preferably 0.340. Similarly for more readily attaining the effects, the uppermost limit of $P_2O_5/Al_2O_3$ is more preferably 0.375, most preferably 0.360.

The three components, $Li_2O$, MgO and ZnO are components that may be readily the constitutive elements of β-quartz solid solution. When combined with the $SiO_2$ component and the $P_2O_5$ component each falling within the above-mentioned composition range, these three components are effective for improving the low-expansion property of the crystallized glass and for reducing the deformation thereof at high temperature, and in addition, they are effective for significantly improving the meltability and the clearness of the glass material. These three components may be optionally in the crystallized glass in case where the crystallized glass may readily enjoy their effects mentioned above.

When the amount of the $Li_2O$ component is at least 3%, the above-mentioned effects may be greatly improved and, in addition, the meltability of the glass material may also be improved thereby resulting in that the homogeneousness of the crystallized glass may be improved. Further, the component is favorable since the precipitation of β-quartz and β-quartz solid solution is greatly improved. When the amount of the component is at most 5%, then the low-expansion property of the crystallized glass may be greatly improved, and the glass may readily have ultra-low-expansion characteristics. Further, the devitrification resistance of the glass material may be bettered and the structure of the precipitated crystal in the crystallized glass after the crystallization stage may be prevented from being coarsened owing to the reduction in the devitrification resistance, therefore resulting in the increase in the mechanical strength of the crystallized glass. For more readily attaining the above-mentioned effects, the lowermost limit of the component amount is most preferably 3.5%. For more readily attaining the effects, the uppermost limit of the component amount is more preferably 4.5%, most preferably 4.3%.

The MgO component is an optional component that may be in the crystallized glass for attaining the above-mentioned effects. When the component is added to the glass and when its amount is at least 0.3%, then it is favorable since the effects may be greatly improved; and when its amount is at most 4%, then the low-expansion property of the crystallized glass may be greatly improved and the glass may have ultra-low-expansion characteristics. For more readily attaining the effects, the lowermost limit of the component amount is most preferably 0.5%. Similarly for more readily attaining the effects, the uppermost limit of the component amount is more preferably 2%, most preferably 1.5%.

The ZnO component is an optional component that may be in the crystallized glass for attaining the above-mentioned effects. When the component is added to the glass and when its amount is at least 0.1%, then it is favorable since the effects may be greatly improved; and when its amount is at most 4%, then the low-expansion property of the crystallized glass may be greatly improved and the glass may have ultra-low-expansion characteristics. Further, the devitrification resistance of the glass material may be bettered and the structure of the precipitated crystal in the glass ceramics after the crystallization stage may be prevented from being coarsened owing to the reduction in the devitrification resistance, therefore resulting in the increase in the mechanical strength of the crystallized glass. For more readily attaining the above-mentioned effects, the lowermost limit of the component amount is most preferably 0.2%. Similarly for more readily attaining the effects, the uppermost limit of the component amount is more preferably 2%, most preferably 1.2%.

The two components, CaO and BaO basically remain in the glass matrix except the crystals precipitated in the crystallized glass, thereby having some influences on the effect of improving the ultra-low-expansion characteristics and the meltability of the glass; and these are optional components that may be in the glass for delicate control of the relative amount of the crystal phase and the glass matrix phase.

For attaining the above-mentioned effects, the CaO component is an optional component in the glass. When its amount is at least 0.3%, then the melt-clarifying effect of the component is remarkable; and when its amount is at most 4%, then the low-expansion property of the glass may be greatly improved and the glass may readily have ultra-low expansion characteristics. In addition, the devitrification resistance of the glass material may be bettered more and the structure of the precipitated crystal in the crystallized glass after the crystallization stage may be prevented from being coarsened owing to the reduction in the devitrification resistance, therefore resulting in the increase in the mechanical strength of the glass. For more readily attaining the above-mentioned effects, the lowermost limit of the component amount is most preferably 0.5%. Similarly for more readily attaining the effects, the uppermost limit of the component amount is more preferably 2%, most preferably 1.5%.

The BaO component is an optional component in the crystallized glass for attaining the above-mentioned effects. When its amount is from 0.3% to 4%, then the low-expansion property of the glass may be greatly improved and the glass may readily have ultra-low expansion characteristics. In addition, the devitrification resistance of the glass material may be bettered more and the structure of the precipitated crystal in the crystallized glass after the crystallization stage may be prevented from being coarsened owing to the reduction in the devitrification resistance, therefore resulting in the increase in the mechanical strength of the glass. For more readily attaining the above-mentioned effects, the lowermost limit of the component amount is most preferably 0.5%. Similarly for more readily attaining the effects, the uppermost limit of the component amount is more preferably 2%, most preferably 1.5%.

The $As_2O_3$ component and the $Sb_2O_3$ component are optional components acting as a clarifying agent in a glass melt for obtaining homogeneous products. In addition, they further act as a nucleating agent. For attaining their effects, the amount of each component is preferably within a range of from 0.5% to 1.5%.

However, since these components may have negative influences on the environment, it is desirable that the glass of the invention does not contain these components when their influences on the environment are taken into consideration.

The $SnO_2$ component and the $CeO_2$ component are optional components that are effective for glass clarification, like the $As_2O_3$ component and the $Sb_2O_3$ component.

For attaining the high clarification effect of those components, the glass shall contain the $SnO_2$ component and/or the $CeO_2$ component, in which the lowermost limit of the content of each component is more preferably 0.05% by mass, most preferably 0.1%. The uppermost limit of the content of each component is preferably 5.0% by mass, more preferably 2.0%, most preferably 1.5%.

For attaining the clarification effect to a higher degree, it is desirable that the glass contain both the $SnO_2$ component and the $CeO_2$ component, in which the content of each of the $SnO_2$ component and the $CeO_2$ component is most desirably within the above-mentioned range.

The fluoride component, the sulfate component and the chloride component are also expected to have the clarification effect, and these are optional components in the glass. For example, the fluoride component may be added to the glass as $MgF_2$ or $CaF_2$; the sulfate component may be as $BaSO_4$; and the chloride component may be as $BaCl_2$, etc.

In order that the glass may attain the clarification effect of those components, it is desirable that the lowermost limit of the total amount of the fluoride component as $F_2$, the sulfate component as $SO_3$ and the chloride component as $Cl_2$ is 0.05 parts by weight relative to 100 parts by weight of the amount of the others, as the oxides thereof, than those components, most preferably 0.15 parts by weight. Similarly, the uppermost limit of the total amount of those components may well be 5 parts by weight, more preferably 2 parts by weight, most preferably 1.5 parts by weight.

For attaining the clarification effect of those components, the lowermost limit of the amount of each component in the glass is more preferably 0.05 parts by weight, most preferably 0.15 parts by weight. Also similarly, for attaining the effect thereof, the uppermost limit of the amount of each component is preferably 3 parts by weight, more preferably 2 parts by weight, most preferably 1.5 parts by weight.

The $MnO_2$ component, the $WO_3$ component, the $Ta_2O_5$ component and the $Nb_2O_5$ component may also be expected to have the clarification effect; and in place of or along with the fluoride component, the sulfate component and the chloride component, the above components may be optionally in the glass of the invention.

For attaining the clarification effect, the lowermost limit of the total content of the $MnO_2$ component, the $WO_3$ component, the $Ta_2O_5$ component and the $Nb_2O_5$ component is more preferably 0.05%, most preferably 0.2%. Similarly, the uppermost limit of the total content of these components may well be 5%, more preferably 3%, most preferably 1.5%.

For attaining the clarification effect, the lowermost limit of the content of each component of these is more preferably 0.05%, most preferably 0.2%. Similarly for attaining the effect, the uppermost limit of the content of each component of these is preferably 5%, more preferably 2%, most preferably 1.5%.

In addition to the above-mentioned component, the crystallized glass of the invention may further contain one and/or at least two of other components SrO, $B_2O_3$, $La_2O_3$, $Bi_2O_3$, $Y_2O_3$, $Gd_2O_3$, $SnO_2$, $CeO_2$, in an amount of at most 2% as the total amount thereof, for delicate control of the properties of the glass but not interfering with the characteristics thereof; and further in addition, the glass may contain one or more of coloring components such as CoO, NiO, $Fe_2O_3$ and $Cr_2O_3$, in an amount of at most 2% as the total amount thereof.

In case where various films are formed on the crystallized glass of the invention for producing optical filters or photomasks for use in semiconductor production, it is desirable that the glass does not contain components of PbO, $Na_2O$ and $K_2O$ that are problematic in the process of film formation in order to prevent ion diffusion of those components.

In case where the crystallized glass of the invention is to have ultra-low expansion characteristics, a main crystal phase having a negative average linear thermal expansion coefficient is precipitated in the glass and, as combined with the glass matrix phase having a positive average linear thermal expansion coefficient therein, it realizes the intended ultra-low expansion characteristics as a whole. For this, it is desirable that the glass does not contain a crystal phase having a positive average linear thermal expansion coefficient, or that is, lithium disilicate, lithium silicate, α-quartz, α-cristobalite, α-tridymite, Zn-petalite, as well as petalite, wollastonite, forsterite, diopsite, nepheline, clinoenstatite, anorthite, celsian, gehlenite, feldspar, willemite, mullite, corundum, rankinite, larnite and their solid solutions. In addition to these, it is also desirable that the glass does not contain tungstates such as Hf tungstate and Zr tungstate, titanates such as magnesium titanate, barium titanate and manganese titanate, and mullite, 2-barium 3-silicate, $Al_2O_3.5SiO_2$ and their solid solutions, for keeping its good mechanical strength.

The heat conductivity and the Young's modulus of the crystallized glass of the invention are preferably as follows, in application to lithography in next-generation semiconductor production devices. The heat conductivity is preferably within a range of from 1.0 to 2.0 W/(m·K), more preferably its lowermost limit is 1.5 W/(m·K) and/or its uppermost limit is 1.9 W/(m·K), since the glass must rapidly cool the material that has become heated in a process of film formation or electronic ray irradiation.

In case where the glass is used as precision members, its Young's modulus is an important parameter for preventing microcracks in weight reduction processing, ultra-precision polishing, and microprocessing, and also for reducing negative influences thereon of external factors such as various types of vibrations. The Young's modulus is preferably within a range of from 85 to 95 GPa, more preferably its lowermost limit is 90 GPa and/or its uppermost limit is 94 GPa.

The crystallized glass of the invention may be produced, for example, according to the method mentioned below. First, materials of glass are weighed, formulated and melted in an ordinary manner at about 1450° C. to 1600° C. The resulting glass melt is shaped into a desired form by casting it in a mold and/or hot-shaping it, and then left cooled.

Next, it is heat-treated so as to convert it into crystallized glass. First, it is kept at a temperature of from 650° C. to 750° C., preferably at a temperature of a lowermost limit of 680° C. and/or an uppermost limit of 720° C., for promoting its nucleation. After the nucleation, it is crystallized at a temperature of from 750° C. to 850° C. When the temperature is lower than 750° C., then it is unfavorable since the main crystal phase could not fully grow; and when it is higher than 850° C., then it is also unfavorable since the starting glass may readily soften and deform or may re-melt. Preferably, therefore, the glass is crystallized at a temperature not lower than the lowermost limit thereof, 770° C. and/or not higher than the uppermost limit thereof, 790° C.

The above-mentioned mask, optical reflection mirror, wafer stage, reticular stage and precision members may be obtained by working the glass ceramics into desired forms and optionally by further working them for lapping, polishing and film formation thereon.

Preferred examples of the invention are described below.

First, starting materials of oxide, carbonate, chloride, sulfide and nitrate were mixed, these were melted in an ordinary melting device at a temperature of from about 1450 to 1600° C. with stirring for homogenization, and thereafter shaped and cooled to obtain shaped glass bodies. Next, these were heat-treated at 650 to 750° C. for about 1 to 150 hours for crystal nucleation, and then further heat-treated for crystallization at 750 to 850° C. for about 1 to 300 hours, thereby obtaining crystallized glass.

Table 1 and Table 2 show the compositions of the starting materials of Examples 1 to 4 relating the crystallized glass of the invention and Comparative Examples 1 to 3, as well as the crystal precipitation peak temperature, the crystal precipitation peak temperature width and the exothermic peak energy in differential thermal analysis of the glass samples, the average linear thermal expansion coefficient at 0 to 50° C. ($\alpha$) thereof, the amount of the OH molecules remaining in the precursor glass, the maximum value ($T_a$) of the transmittance at a wavelength around 2.0 μm, the minimum value ($T_b$) of the transmittance at a wavelength around 2.21 μm, the main crystal phase, and the presence or absence of cracks in the shaped glass articles. In Examples and Comparative Examples, the composition is in terms of % by mass. Regarding the presence or absence of cracks after shaping, the cracked samples are "not good", and the samples not cracked are "good" in the following Tables.

FIG. 1 shows a photograph of the microstructure of the sample of Example 1, taken with a transmission electronic microscope (TEM). Briefly, the sample was sliced into thin sections with an ion-milling device (Gatan's PIPS), and the section was observed with Hitachi's transmission electronic microscope, H800. The invention should not be limited to only the following Examples.

TABLE 1

| Composition | Example | | | |
|---|---|---|---|---|
| (mass %) | 1 | 2 | 3 | 4 |
| $SiO_2$ | 55.0 | 55.0 | 55.0 | 55.0 |
| $Al_2O_3$ | 24.0 | 24.0 | 24.0 | 24.0 |
| $P_2O_5$ | 8.3 | 8.4 | 8.35 | 8.45 |
| $Li_2O$ | 4.0 | 4.0 | 4.0 | 4.0 |
| MgO | 1.0 | 1.0 | 1.0 | 1.0 |
| CaO | 1.0 | 1.0 | 1.0 | 1.0 |
| BaO | 1.0 | 1.0 | 1.0 | 1.0 |
| ZnO | 0.5 | 0.5 | 0.5 | 0.5 |
| $ZrO_2$ | 1.7 | 1.6 | 1.65 | 1.55 |
| $TiO_2$ | 2.3 | 2.3 | 2.3 | 2.3 |
| $As_2O_3$ | 1.2 | 1.2 | 1.2 | 1.2 |
| total | 100.0 | 100.0 | 100.0 | 100.0 |
| $ZrO_2 + TiO_2$ | 4.00 | 3.90 | 3.95 | 3.85 |
| OH molecules (ppm) | 649 | 661 | 647 | 654 |

TABLE 1-continued

| Composition | Example | | | |
|---|---|---|---|---|
| (mass %) | 1 | 2 | 3 | 4 |
| Transmittance, $T_a$ (%) | 91.2 | 91.3 | 91.5 | 91.3 |
| Transmittance, $T_b$ (%) | 80.2 | 80.1 | 80.5 | 80.2 |
| Main Crystal Phase | β-quartz solid solution | β-quartz solid solution | β-quartz solid solution | β-quartz solid solution |
| Exothermic Peak Temperature (° C.) | 983.1 | 1002.7 | 972.3 | 976.0 |
| Crystal Precipitation Peak Temperature Width (° C.) | 28.5 | 38.7 | 25.3 | 25.5 |
| Exothermic Peak Energy (μV/mg) | 0.08511 | 0.05227 | 0.09790 | 0.08325 |
| $\alpha$ (0-50° C.) ($10^{-7}$ °C.$^{-1}$) | 0.17 | 0.25 | 0.06 | 0.13 |
| Crystallization Temperature (° C.) | 780 | 780 | 780 | 780 |
| Mean Crystal Particle Size (nm) | 60 | 60 | 70 | 70 |
| Cracks after shaping (Cracked samples are "not good".) | good | good | good | good |

TABLE 2

| Composition (mass %) | Comparative Example | | |
|---|---|---|---|
| | 1 | 2 | 3 |
| $SiO_2$ | 55.0 | 55.0 | 55.0 |
| $Al_2O_3$ | 24.0 | 24.0 | 24.0 |
| $P_2O_5$ | 8.0 | 8.0 | 8.0 |
| $Li_2O$ | 4.0 | 4.0 | 4.0 |
| MgO | 1.0 | 1.0 | 1.0 |
| CaO | 1.0 | 1.0 | 1.0 |
| BaO | 1.0 | 1.0 | 1.0 |
| ZnO | 0.5 | 0.5 | 0.5 |
| $ZrO_2$ | 2.0 | 1.8 | 1.7 |
| $TiO_2$ | 2.5 | 2.4 | 2.4 |
| $As_2O_3$ | 1.0 | 1.3 | 1.4 |
| total | 100.0 | 100.0 | 100.0 |
| $ZrO_2 + TiO_2$ | 4.50 | 4.20 | 4.10 |
| OH molecules (ppm) | 807 | 687 | 609 |
| Transmittance, $T_a$ (%) | 91.4 | 91.2 | 91.5 |
| Transmittance, $T_b$ (%) | 77.9 | 79.6 | 81.1 |
| Main Crystal Phase | β-quartz solid solution | β-quartz solid solution | β-quartz solid solution |
| Exothermic Peak Temperature (° C.) | 874.0 | 924.7 | 935.2 |
| Crystal Precipitation Peak Temperature Width (° C.) | 19.6 | 19.7 | 21.6 |
| Exothermic Peak Energy (μV/mg) | 0.11082 | 0.11053 | 0.10994 |
| $\alpha$ (0-50° C.) ($10^{-7}$ °C.$^{-1}$) | −0.02 | 0.23 | 0.18 |
| Crystallization Temperature (° C.) | 780 | 780 | 780 |
| Mean Crystal Particle Size (nm) | 70 | 70 | 70 |
| Cracks after shaping (Cracked samples are "not good".) | not good | not good | not good |

The average linear thermal expansion coefficient was determined, using a Fizeau interferometer for precision expansion measurement. The shape of the test sample is columnar, having a diameter of 30 mm and a length of about 27 mm. The method is as follows: An optical plate is kept in contact with both edges of the sample in order that interference fringes could be observed with an HeNe laser, and the sample is put into a temperature-controllable furnace. Next, the temperature of the sample is varied, and the change of the interference fringes is observed whereby the change of the sample length that varies depending on the sample temperature is profiled. In the actual test, the sample was analyzed under two conditions, or that is, heating condition and cooling condition. The change of the sample length under the two conditions was determined, and the data were averaged to be ΔL.

The average linear thermal expansion coefficient is computed according to the following formula, in which a indicates the average linear thermal expansion coefficient, ΔT indicates the test temperature range, and L indicates the length of the test sample. $\alpha(°C.^{-1})$ is as follows:

$$\alpha=(\Delta L/L)/\Delta T.$$

Unless otherwise specifically indicated in this description, the average linear thermal expansion coefficient is expressed as a unit of $(10^{-7°} C.^{-1})$.

As in Table 1, the crystallized glass samples of Examples of the invention had a fine structure having a crystal particle size of at most 90 nm. Regarding their thermal expansion characteristics, they had a average linear thermal expansion coefficient at 0° C. to 50° C. falling within a range of at most 0±0.3 $(10^{-7°} C.^{-1})$.

The crystallized glass samples of Examples of the invention had a heat conductivity of from 1.6 to 1.8 W/(m·K), and a Young's modulus of from 90 to 93 GPa or less.

The OH group content of the glass samples was determined according to the following method.

According to the Lambert-Beer formula, the OH group content may be represented as follows:

$$C=1/\alpha t\,\log_{10}(T_a/T_b)$$

wherein C is the content of OH molecules (ppm); α is the molar absorption coefficient of water (8.6 L/mol·mm); t is the thickness of the polished glass sample (mm); and $T_a$ and $T_b$ each are the transmittance (%) at the indicated wavelength.

The transmittance is as follows: A sample of glass before heat treatment for crystallization was polished to have a thickness of 10 mm, and this was analyzed with Hitachi's 270-30 Model IR spectrophotometer. The maximum value of the transmittance of the sample at a wavelength of about 2.0 μm is $T_a$, and the minimum value of the transmittance thereof at a wavelength of about 2.21 μm is $T_b$. From these, the content of the OH molecules in the glass sample was obtained. The transmittance includes surface reflection loss. The amount of the OH molecules remaining in the samples of Examples was all less than 700 ppm.

For DTA, used was Netzsch's STA409CD, in which the sample was put in an alumina crucible and analyzed for the crystal precipitation peak temperature, the crystal precipitation peak temperature width and the exothermic peak energy thereof.

As mentioned hereinabove, the crystallized glass of the invention is applicable to masks for lithography, optical reflection mirrors, parts of semiconductor production devices such as wafer stages and reticular stages, parts of liquid-crystal exposure devices, parts of large-size reflection mirrors, as well as to other various precision members such as parts of standard scales, prototypes and testers. Further, as having high transparency, the glass ceramics of the invention are usable in various applications that require high optical transmittance, for example, as substrates for optical filters, and transmission masks for lithography. In addition, the glass ceramics of the invention are applicable to other various members and parts, as having high mechanical strength, and they may be effectively worked for weight reduction.

What is claimed is:

1. Crystallized glass comprising, in percent by mass:
   $SiO_2+Al_2O_3+P_2O_5$: from 86.0 to 89.0%;
   $TiO_2+ZrO_2$: from 3.0% to less than 4.3%;
   $P_2O_5/SiO_2$: from 0.1495 to 0.1720; and
   $P_2O_5/Al_2O_3$: from 0.330 to 0.390,
   wherein the crystal precipitation peak temperature width obtained in differential thermal analysis of an amorphous glass or an amorphous glass precursor, is at least 22° C.

2. Crystallized glass or an claimed in claim 1, wherein the crystal precipitation peak temperature width is at least 22° C. and at most 45° C.

3. Crystallized glass as claimed in claim 1, which further contains an $Li_2O$ component (as oxide).

4. Crystallized glass as claimed in claim 1, wherein the crystal precipitation peak temperature obtained in differential thermal analysis of the amorphous glass or the amorphous glass precursor, is within a range of from 950° C. to 1050° C.

5. Crystallized glass as claimed claim 1, wherein the content of the $Ti_2$ component is within a range of from 1.6 to 3.0% and the content of the $ZrO_2$ component is within a range of from 1.3 to 2.5%, in terms of percent by mass of the oxide.

6. Crystallized glass as claimed in claim 1, which contains β-quartz (β-$SiO_2$) and/or β-quartz solid solution (β-$SiO_2$ solid solution) as a main crystal phase thereof.

7. Crystallized glass as claimed in claim 1, having an amount of OH molecules contained in the amorphous glass or the amorphous glass precursor of at most 700 ppm.

8. Crystallized glass as claimed in claim 1, having a mean crystal particle size of a precipitated crystal phase within a range of from 5 to 200 nm.

9. Crystallized glass as claimed in claim 1, wherein the maximum temperature in thermal treatment for crystallization is from 750 to 850° C.

10. Crystallized glass as claimed in claim 1, of which the average linear thermal expansion coefficient within a temperature range of from 0 to 50° C. is within 0.0±0.5 $(10^{-7°} C.^{-1})$ and (maximum value−minimum value) of ΔL/L is within a range of $10×10^{-7}$.

11. Crystallized glass as claimed in claim 1, obtained through thermal treatment for crystallization of a starting glass that contains in percent by mass $SiO_2$ from 50 to 62%.

12. Crystallized glass as claimed in claim 3, which contains the $Li_2O$ component in an amount of from 3 to 5% in terms of percent by mass of the oxide.

13. Crystallized glass as claimed in claim 1, which contains the following components in the amount indicated below in terms of percent by mass of the oxide:
   MgO, from 0 to 4% and/or
   ZnO, from 0 to 4% and/or
   CaO, from 0 to 4% and/or
   BaO, from 0 to 4%.

14. Crystallized glass as claimed in claim 1, which contains the following components in the amount indicated below in terms of percent by mass of the oxide:
   $SnO_2$, from 0.01 to 5.0% and/or
   $CeO_2$, from 0.01 to 5.0%.

15. Crystallized glass as claimed in claim 1, which contains at least one or more components selected from a fluoride component, a sulfate component, a chloride component, an $MnO_2$ component (as oxide), a $WO_3$ component (as oxide), a $Ta_2O_5$ component (as oxide) and an $Nb_2O_5$ component (as oxide).

16. Crystallized glass as claimed in claim 1, which does not substantially contain PbO, $Na_2O$ and $K_2O$ components (as oxides).

17. The crystallized glass of claim 1, wherein the glass is included in a mask for lithography.

18. The crystallized glass of claim 1, wherein the glass is included in an optical reflection mirror for lithography.

19. The crystallized glass of claim 1, wherein the glass is included in a wafer stage or reticule stage for lithography.

20. The crystallized glass of claim 1, wherein the glass is included in a precision instrument.

* * * * *